United States Patent
Norden et al.

(10) Patent No.: US 10,558,257 B2
(45) Date of Patent: Feb. 11, 2020

(54) SYSTEMS AND METHODS FOR EXITING LOW-POWER STATES

(71) Applicant: Dell Products L.P., Round Rock, TX (US)

(72) Inventors: Hahn Norden, Austin, TX (US); David E. Rock, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 87 days.

(21) Appl. No.: 15/884,829

(22) Filed: Jan. 31, 2018

(65) Prior Publication Data
US 2019/0235616 A1    Aug. 1, 2019

(51) Int. Cl.
| | | |
|---|---|---|
| G06F 1/32 | (2019.01) | |
| G06F 1/3293 | (2019.01) | |
| G06F 11/30 | (2006.01) | |
| G06F 1/30 | (2006.01) | |
| G06F 1/3234 | (2019.01) | |

(52) U.S. Cl.
CPC ............ *G06F 1/3293* (2013.01); *G06F 1/305* (2013.01); *G06F 1/3253* (2013.01); *G06F 11/3051* (2013.01); *G06F 11/3006* (2013.01)

(58) Field of Classification Search
CPC .................................................... G06F 1/3253
See application file for complete search history.

(56) References Cited

U.S. PATENT DOCUMENTS

| | | | | |
|---|---|---|---|---|
| 2006/0149977 A1* | 7/2006 | Cooper | ................. | G06F 1/3215 713/300 |
| 2014/0195830 A1* | 7/2014 | Chin | ..................... | G06F 1/1626 713/320 |
| 2018/0129269 A1* | 5/2018 | Garg | ..................... | G06F 1/3287 |

OTHER PUBLICATIONS

TR-202 ADSL2/ADSL2plus Low-Power Mode Guidelines, Issue: 1, Issue Date: Feb. 2010, The Broadband Forum.
PCI Express Base Specification Revision 3.1a, Dec. 7, 2015.

\* cited by examiner

*Primary Examiner* — Albert Wang
(74) *Attorney, Agent, or Firm* — Jackson Walker L.L.P.

(57) ABSTRACT

An information handling system may include at least one processor, and an information handling resource communicatively coupled to the at least one processor. The information handling system may be configured to cause the information handling resource to enter a low-power state, and further configured to cause the information handling resource to enter a full-power state. The information handling system may also be configured to cause at least one communication link of the information handling resource to remain inactive until detection of a specified event.

17 Claims, 2 Drawing Sheets

SYSTEMS AND METHODS FOR EXITING LOW-POWER STATES

TECHNICAL FIELD

The present disclosure relates in general to information handling systems, and more particularly to methods and systems for exiting a low-power state without inducing instability.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some situations, information handling resources (e.g., Peripheral Component Interconnect (PCI) or Peripheral Component Interconnect Express (PCIe) devices) may experience electrical instability during exit from a low-power state. Somewhat similarly to when a device is first powered on (or fully reset), a device's exit from a low-power state may cause signals to transition from power logic 0 to power logic 1. As currents rush through electrical traces on such devices, electromagnetic fields are generated around the traces. These fields may interfere with the operations of the devices, resulting in system failures, device malfunctions, link or synchronization failures, slower negotiated link speeds, etc.

In the situation of a device being powered on from a powered-off state (or returning from a power reset), a power good ("PGood") signal may delay initialization of internal logic and functionality until stability has been reached. Further, in addition to the assertion of PGood to indicate power stability, some systems also add a delay module to cause further delay between the assertion of PGood and the de-assertion of a system reset signal, to further gate off internal logic; such a delay module may be used to ensure that when system reset is de-asserted and devices' functionalities are enabled, the devices are already in a stable state.

Various techniques relating to initial power-on are described in the PCI Express® Base Specification Revision 3.1a, published Dec. 7, 2015 (hereinafter, PCIe Base Specification), which is hereby incorporated by reference in its entirety.

Unlike when the system or device is first powered on, however, exiting from a low-power state typically does not benefit from the protection of the PGood signal or any delay modules. The return from a low-power state to a full-power state may result in a relative increase in crosstalk levels, and hence a relative decrease in the operating signal-to-noise ratio. During this time period, the system is considered to be in an "unstable period". The high cross-talk and low signal-to-noise ratio affect the operation of nearby conductors, including differential signal pairs, which may have detrimental effects either in the form of data transmission errors or even collapse of the transmission system. In some cases, a device may attempt to negotiate a communications link during the "unstable period" and be only partially successful, with the result that the communications link may not operate at full speed. (For example, a PCIe ×8 device might only negotiate to operate at ×4 speeds, etc.)

Thus in general, when a device has been in a low-power state (such as an L2 state or an L3 state) and is returned to full power, there is typically no assurance that the device will reach a stable state before negotiation of a communication link is attempted. This can cause various adverse effects.

This disclosure provides techniques that may be employed to mitigate instabilities in these and other situations.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with exiting from low-power states in information handling systems may be reduced or eliminated.

In accordance with embodiments of the present disclosure, an information handling system may include at least one processor, and an information handling resource communicatively coupled to the at least one processor. The information handling system may be configured to cause the information handling resource to enter a low-power state. The information handling system may be further configured to cause the information handling resource to enter a full-power state. The information handling system may yet be further configured to cause at least one communication link of the information handling resource to remain inactive until detection of a specified event.

In these and other embodiments, a method may include detecting that an information handling resource of an information handling system is in a low-power state. Such a method may further include detecting that the information handling resource has exited the low-power state to enter a full-power state. Finally, such a method may further include causing at least one communication link of the information handling resource to remain inactive until detection of a specified event In these and other embodiments, an apparatus may include a control circuit coupleable to an information handling resource. Such a control circuit may be configured to detect that the information handling resource has entered a low-power state. The control circuit may be further configured to detect that the information handling resource has entered a full-power state. The control circuit may yet be further configured to cause at least one communication link of the information handling resource to remain inactive until detection of a specified event.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
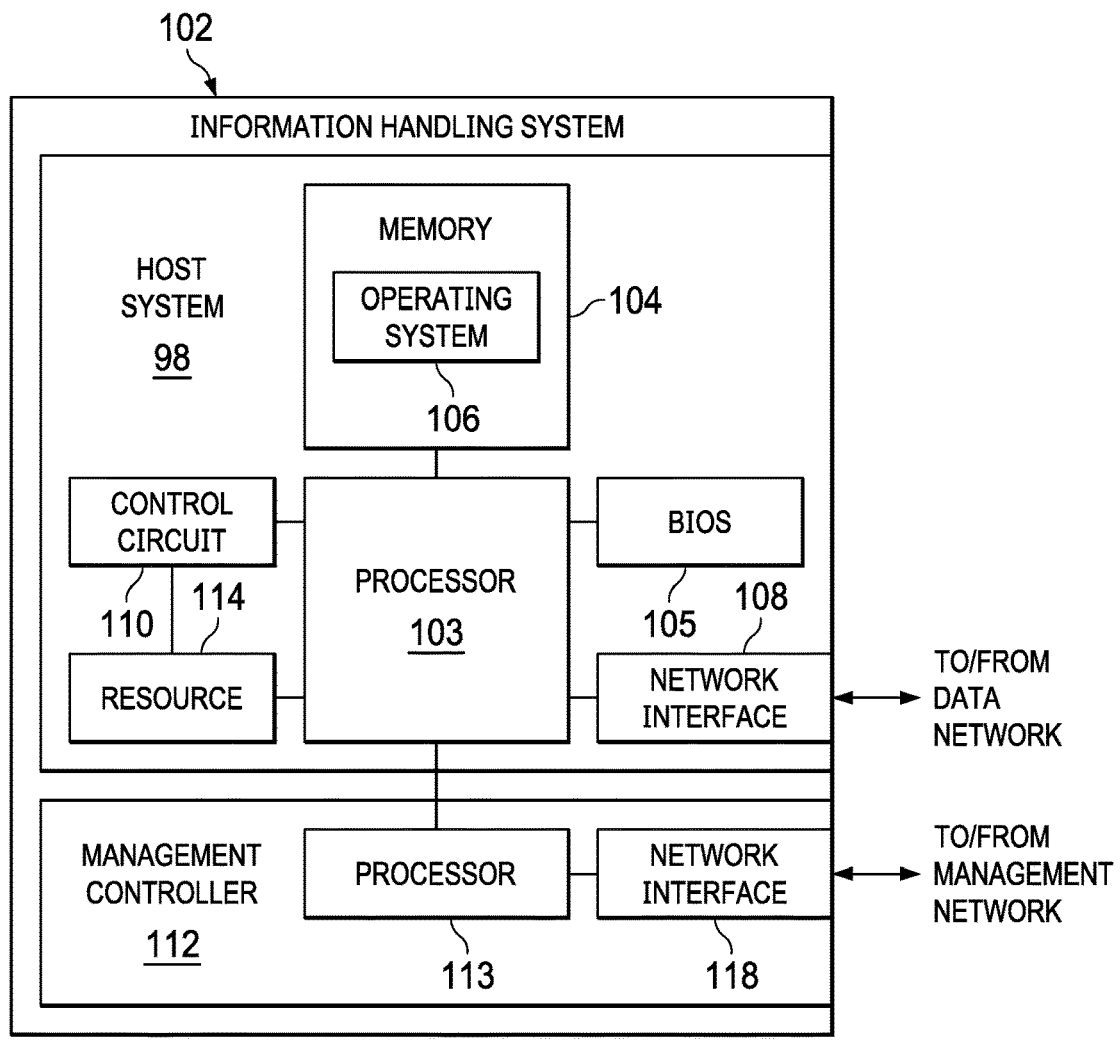
FIG. 1 illustrates a block diagram of an example information handling system, in accordance with embodiments of the present disclosure.
Figure 2:
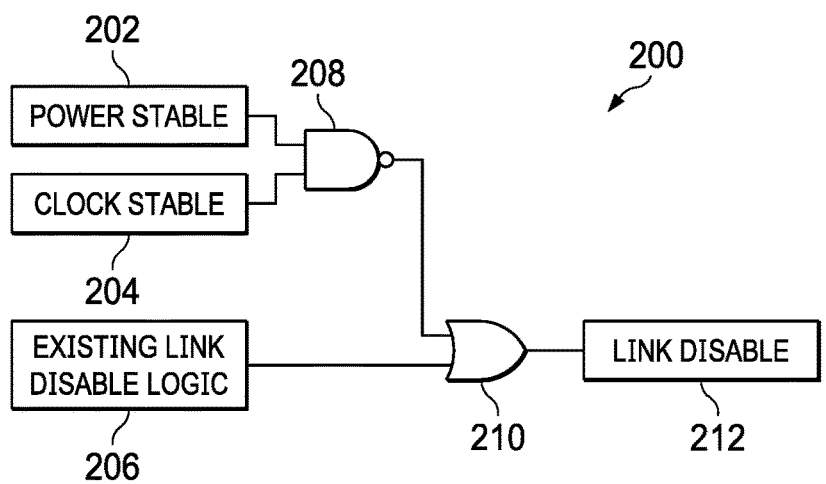
FIG. 2 illustrates a block diagram of an example control circuit, in accordance with embodiments of the present disclosure.
Figure 3:
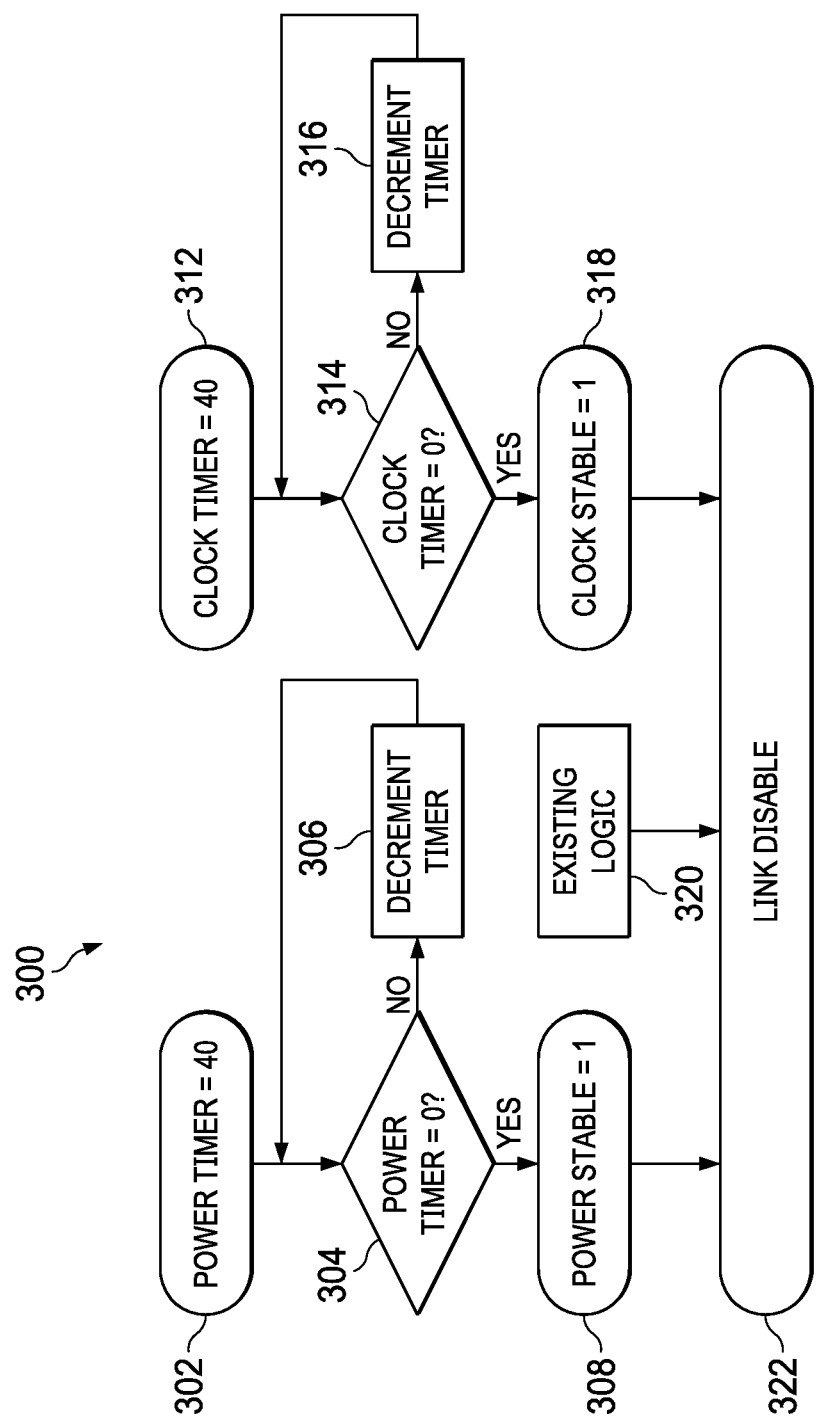
FIG. 3 illustrates a flow chart of an example method, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected indirectly or directly, with or without intervening elements. When two or more elements are referred to as "coupleable" to one another, such term indicates that they are capable of being coupled together.

For the purposes of this disclosure, computer-readable media (e.g., transitory or non-transitory computer-readable media) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103.

Information handling system may also include one or more information handling resources 114 communicatively coupled to processor 103, as well as control circuit 110. As described in further detail below, control circuit 110 may include any system, device, or apparatus configured to control the operation of information handling resource 114. For example, control circuit 110 may be operable to prevent information handling resource 114 from establishing a communications link until certain conditions are met.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may be used for network booting of a client information handling system from a server information handling system (e.g., via network interface 108).

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

Management controller 112 may be configured to provide management facilities for management of information handling system 102. Such management may be made by management controller 112 even if information handling system 102 and/or host system 98 are powered off or powered to a standby state. Management controller 112 may include a processor 113, memory, and a management network interface 118 separate from and physically isolated from data network interface 108. In certain embodiments, management controller 112 may include or may be an integral part of a baseboard management controller (BMC), a chassis management controller (CMC), or a remote access controller (e.g., a Dell Remote Access Controller or Integrated Dell Remote Access Controller).

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network 108, or in other embodiments it may be a device of a different type.

In operation, host system 98 may include or operate as a root complex (e.g., a PCIe root complex) for communication among various endpoints (e.g., PCIe endpoints) within or associated with information handling system 102. Such endpoints may include management controller 112, one or more information handling resources 114, and/or any other suitable information handling resource. In addition, management controller 112 may serve as a proxy for routing data to different endpoints coupled to the root complex of host system 98 in some embodiments. In some embodiments, a root complex may be coupled to a switch, which may be coupled to various endpoints each via one or more communications links. Each of such communications links may include one or more lanes.

In some embodiments, control circuit 110 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In other embodiments, control circuit 110 may be a relatively simple device, for example made up of one or more logic gates and/or other discrete or integrated components. In general, control circuit 110 may be configured to control the operational state of one or more information handling resources 114.

As noted above, information handling resource 114 may be a PCIe endpoint in some embodiments. As one of ordinary skill in the art with the benefit of this disclosure will understand, various power states may be available to such a PCIe endpoint device. Table 1 below (reproduced from PCIe Base Specification) provides a summary.

TABLE 1

| | L-State Description | Used by S/W Directed PM | Used by ASPM | Platform Reference Clocks | Platform Main Power | Component Internal PLL | Platform Vaux |
|---|---|---|---|---|---|---|---|
| L0 | Fully active Link | Yes (D0) | Yes (D0) | On | On | On | On/Off |

TABLE 1-continued

| L-State | Description | Used by S/W Directed PM | Used by ASPM | Platform Reference Clocks | Platform Main Power | Component Internal PLL | Platform Vaux |
|---|---|---|---|---|---|---|---|
| L0s | Standby state | No | Yes[1] (opt., D0) | On | On | On | On/Off |
| L1 | Lower power standby | Yes (D1-D3$_{hot}$) | Yes (opt., D0) | On/Off[8] | On | On/Off[2] | On/Off |
| L2/L3 Ready (pseudo-state) | Staging point for power removal | Yes[3] | No | On/Off[8] | On | On/Off | On/Off |
| L2 | Low power steep state (all clocks, main power off) | Yes[4] | No | Off | Off | Off | On[5] |
| L3 | Off (zero power) | n/a | n/a | Off | Off | Off | Off |
| LDn (pseudo-state) | Transitional state preceding L0 | Yes | N/A | On | On | On/Off | On/Off |

Information handling system 102 may put information handling resource 114 into a low-power state for any of a variety of reasons. For example, idleness criteria may trigger a low-power state. As another example, during the initialization period of one device (e.g., a memory module), a low-power state may be triggered for some other device, e.g., to save power.

In some embodiments, a link control register may be used to manage the state of information handling resource 114 and its one or more communications links. In some embodiments, a link control register may include a bit (e.g., a link disable bit) that, while asserted, causes a communication link to remain disabled. Such a link disable bit may also be referred to as a link disable register, in some embodiments When it is time for information handling resource 114 to return to full-power, control circuit 110 may cause a specified delay to occur before allowing link renegotiation by maintaining such a link disable bit in an asserted state.

In some embodiments, control circuit 110 may wait a specified amount of time before de-asserting the link disable bit. For example, such an amount of time may be the same as (or smaller or larger than) the amount of time that would be used if information handling resource 114 were coming back from a powered off state.

In other embodiments, control circuit 110 may receive one or more inputs related to the operational state of information handling resource 114 and control the link disable bit based on such inputs. Thus the delay need not be a fixed amount of time, but may depend on the operational state of information handling resource 114. An example of such an embodiment is described below with reference to FIG. 2.

In addition to the elements shown in FIG. 1, information handling system 102 may include one or more other information handling resources. Further, although FIG. 1 depicts information handling system 102 as only having a single host system 98 for the purposes of clarity and exposition, in some embodiments, information handling system 102 may comprise a server rack including a plurality of racks of host systems 98.

Turning now to FIG. 2, an embodiment of control circuit 200 is shown which may be used to implement various aspects of the present disclosure. In particular, control circuit 110 from FIG. 1 may be implemented as control circuit 200 in some embodiments. Control circuit 200 may be used to determine the value of the link disable bit discussed above, and thus to control the operational state of information handling resource 114.

According to some embodiments, control circuit 200 may operate via two new signals (e.g., registers or bits). A power stable register 202 is used to indicate whether the power being supplied to an information handling resource is stable, and a clock stable register 204 is used to indicate whether the clock signal is stable. As shown, the logical values of power stable register 202 and clock stable register 204 are combined at NAND gate 208.

The result of this logical operation may then be combined with any other existing logic configured to drive the link disable bit, which is shown at existing link disable logic 206. This is accomplished via OR gate 210.

Thus in this embodiment, link disable 212 is de-asserted (indicating the link is ready for use) whenever: (1) the power is stable, (2) the clock is stable, and (3) the existing logic for driving the link disable bit is de-asserted. One of ordinary skill in the art with the benefit of this disclosure will recognize various other ways that control circuit 200 might be implemented to obtain a similar or identical result.

One of ordinary skill in the art with the benefit of this disclosure will further recognize various possibilities for determining the values of power stable register 202 and clock stable register 204, to be used as inputs to control circuit 200. For example, these registers may be asserted by the expiration of a timer in some embodiments, based on a specification or on knowledge of the respective clock and power rails and the maximum amount of time that should be needed to reach stability. In other embodiments, an additional circuit (not shown) may be used to measure or create a histogram of the clock duty cycle and power rail voltages. Such an additional circuit may be similar or identical to that used during initial power up, or it may be any other suitable circuit.

Turning now to FIG. 3, a flow chart of an example method 300 is shown for determining the values of power stable register 202 and clock stable register 204, in accordance with certain embodiments of the present disclosure. In particular, method 300 may be used in the case noted above in which timers are used to determine when these registers should be asserted. According to some embodiments, method 300 may begin at step 302. As noted above, teachings of the present disclosure may be implemented in a variety of configurations, such as within the context of information handling systems 102.

Within the context of method 300, various registers may be used to hold desired values. Power stable register 202 and clock stable register 204 may be used as discussed above. Additionally, a power timer register and a clock timer register may be used to implement timers to determine when power stable register 202 and clock stable register 204, respectively, should be asserted. In some embodiments, other registers (for example, specifying units such as milliseconds or microseconds for the timers) may also be included.

At step 302, the power timer is set with some initial value. In the example shown, the initial value is 40 microseconds.

At step 304, the power timer is tested for equality to zero. If the power timer is not yet equal to zero, it is decremented at step 306, and this portion of the method loops. Eventually, the power timer reaches zero, and the method proceeds to step 308.

At step 308, the power stable register is asserted based on the expiration of the power timer.

In parallel with the foregoing portion of method 300, an analogous process may be carried out with regard to the clock timer.

At step 312, the clock timer is set with some initial value. In the example shown, the initial value is 40 microseconds. This value may be, but need not be, the same as the initial value of the power timer.

At step 314, the clock timer is tested for equality to zero. If the clock timer is not yet equal to zero, it is decremented at step 316, and this portion of the method loops. Eventually, the clock timer reaches zero, and the method proceeds to step 318.

At step 318, the clock stable register is asserted based on the expiration of the clock timer.

Meanwhile, any existing logic for determining whether the link disable bit should be asserted (as discussed above) is carried out at step 320.

Finally, at step 322, the results of the foregoing (e.g., power stable, link stable, and existing logic) are combined to determine the value of the link disable bit.

In particular, method 300 is arranged such that while power stable is de-asserted, link disable remains asserted. Similarly, while clock stable is de-asserted, link disable remains asserted. And while the existing logic indicates that the link should not be enabled, link disable remains asserted. It is only when all of these inputs align that link disable is finally de-asserted, and link negotiation may begin. One circuit for combining the inputs in this way is discussed above with reference to FIG. 2.

After step 322, method 300 ends.

One of ordinary skill in the art with the benefit of this disclosure will understand that the disclosed techniques may be applied in a number of different situations. For example, the disclosed techniques may also be applied in devices that use SRIS (Separate Refclk Independent Spread spectrum clocking). Even in PCIe solutions where the endpoint devices do not require a reference clock from the host, techniques according to this disclosure may provide benefits.

Further, it should be noted that embodiments of this disclosure may remain fully compliant with the PCIe Base Specification, and need not violate any of its requirements.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   an information handling resource communicatively coupled to the at least one processor;
   wherein the information handling system is configured to:
      in response to initialization of a second information handling resource, cause the information handling resource to enter a low-power state;
      cause the information handling resource to enter a full-power state; and
      cause at least one communication link of the information handling resource to remain inactive until detection of a specified event.

2. The information handling system of claim 1, further comprising a control circuit configured to:
   determine a first signal based on whether or not power is stable for the information handling resource; and
   determine a second signal based on whether or not a clock is stable for the information handling resource;
   wherein the specified event is based on a determination that the power is stable and the clock is stable.

3. The information handling system of claim 2, wherein the control circuit includes a plurality of logic gates configured to combine the first signal, the second signal, and at least one other signal relating to disabling the at least one communication link.

4. The information handling system of claim 2, wherein the control circuit is further configured to store the first and second signals in registers.

5. The information handling system of claim 1, wherein the second information handling resource is a memory.

6. The information handling system of claim 1, wherein the at least one communication link is a Peripheral Component Interconnect Express (PCIe) link.

7. The information handling system of claim 6, wherein the low-power state is an L2 state or an L3 state.

8. A method comprising:
- detecting that an information handling resource of an information handling system is in a low-power state;
- detecting that the information handling resource has exited the low-power state to enter a full-power state; and
- causing at least one communication link of the information handling resource to remain inactive until detection of a specified event, wherein the specified event is based on a detection that power supplied to the information handling resource is stable, and further based on a detection that a clock signal at the information handling resource is stable.

9. The method of claim 8, wherein the information handling resource is a Peripheral Component Interconnect Express (PCIe) device, and wherein the low-power state is an L2 state or an L3 state.

10. The method of claim 8, wherein the specified event is based on a detection that a specified period of time has elapsed.

11. An apparatus comprising:
- a control circuit coupleable to an information handling resource;
- wherein the control circuit is configured to:
  - detect that the information handling resource has entered a low-power state;
  - detect that the information handling resource has entered a full-power state;
  - determine a first signal based on whether or not power is stable for the information handling resource;
  - determine a second signal based on whether or not a clock is stable for the information handling resource; and
  - cause at least one communication link of the information handling resource to remain inactive until detection of a specified event, wherein the specified event is based on a determination that the power is stable and the clock is stable.

12. The apparatus of claim 11, further comprising a plurality of logic gates configured to combine the first signal, the second signal, and at least one other signal relating to disabling the at least one communication link.

13. The apparatus of claim 11, further comprising registers for storing the first and second signals.

14. The apparatus of claim 11, wherein the at least one communication link is a Peripheral Component Interconnect Express (PCIe) link.

15. The apparatus of claim 14, wherein the control circuit is further configured to assert a link disable signal until the specified event is detected.

16. The apparatus of claim 14, wherein the low-power state is an L2 state.

17. The apparatus of claim 14, wherein the low-power state is an L3 state.

* * * * *